United States Patent [19]
Beth et al.

[11] Patent Number: 5,562,135
[45] Date of Patent: Oct. 8, 1996

[54] COMBINATION WOODWORKING TOOL

[75] Inventors: David E. Beth, St. Charles, Mo.; James B. Watson, Conyers, Ga.; Daniel A. Terpstra, Kirkwood; James I. Metzger, Jr., Ballwin, both of Mo.; J. Douglas Alsup, Conyers; William J. Saunders, Lithonia, both of Ga.

[73] Assignee: Emerson Electric Co., St. Louis, Mo.

[21] Appl. No.: 356,505

[22] Filed: Dec. 15, 1994

[51] Int. Cl.$^6$ .................................. B27C 9/00
[52] U.S. Cl. ............................ 144/1.1; 144/48.7
[58] Field of Search .................. 144/1 R, 1 C, 144/286 R, 1 G, 286 A; 409/231; 408/124, 127

[56] References Cited

U.S. PATENT DOCUMENTS

| | | | |
|---|---|---|---|
| 2,765,009 | 10/1956 | Doerner | 144/1 R |
| 3,282,309 | 11/1966 | Parker et al. | 144/1 |
| 3,387,638 | 6/1968 | West | 144/1 R |
| 4,318,432 | 3/1982 | Howey | 144/1 C |
| 4,494,591 | 1/1985 | Folkerth | 144/286 |
| 4,497,353 | 2/1985 | Sprout, Jr. | 144/1 R |
| 4,510,980 | 4/1985 | Bartlett et al. | 144/1 |
| 4,566,510 | 1/1986 | Bartlett et al. | 144/1 |
| 5,009,554 | 4/1991 | Kameyama et al. | 409/231 |
| 5,443,103 | 8/1995 | Kopacz et al. | 144/1 R |
| 5,468,101 | 11/1995 | Shoda | 409/202 |

*Primary Examiner*—W. Donald Bray
*Assistant Examiner*—Gene L. Kim
*Attorney, Agent, or Firm*—Polster, Lieder, Woodruff & Lucchesi

[57] ABSTRACT

A combination woodworking tool is disclosed. The combination woodworking tool includes a frame having a horizontal bed for supporting workpieces. A rigid column is supported by the frame in proximity to and extends vertically upwardly beyond the horizontal bed. A powerhead is mounted to an upper end of the column in overlying relationship to the horizontal bed, the powerhead being vertically adjustable for movement toward and away from the horizontal bed. The powerhead further includes a motor and spindle which extends below a lower end of the powerhead. The spindle is adapted to interchangeably receive a chuck for use with a drill or a collet for use with a router. The powerhead is adjustably and rotatably mounted relative to the column for positioning the spindle in predetermined vertical, angular or horizontal positions relative to the horizontal bed for vertical, angular or horizontal drilling or routing. In conjunction with the different relative positions of the powerhead, the horizontal bed is also adjustable to provide different woodworking operations. The powerhead is also adapted to be vertically adjusted in proximity to the horizontal bed while also be rotatably adjusted relative to the column for positioning the spindle in a horizontal and proximate position relative to the horizontal bed for cooperation with a separately mounted lathe tail stock and tool rest in operating the combination woodworking tool as a lathe.

25 Claims, 6 Drawing Sheets

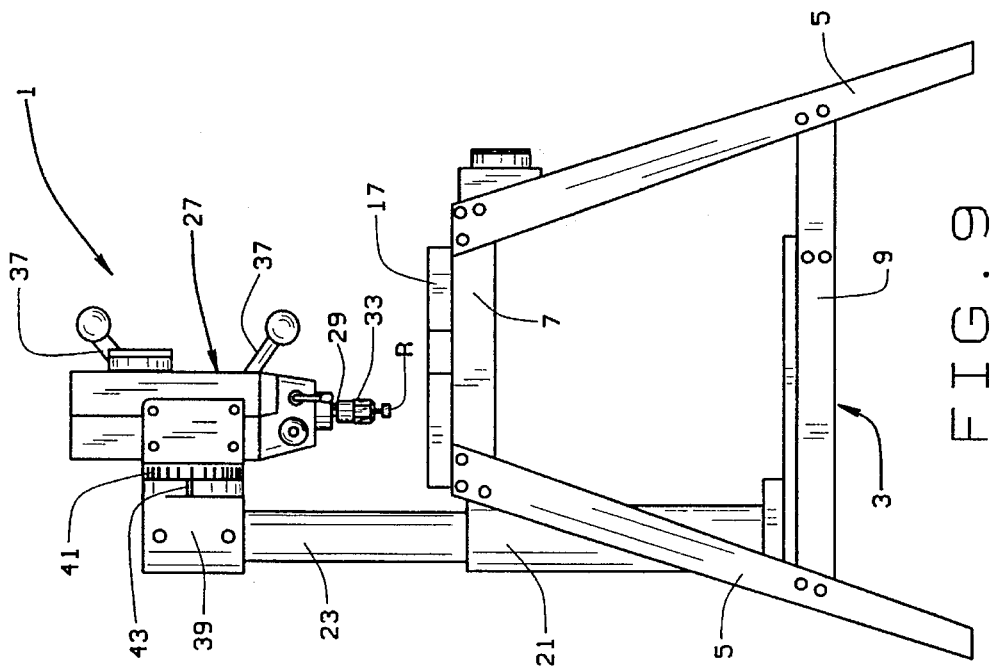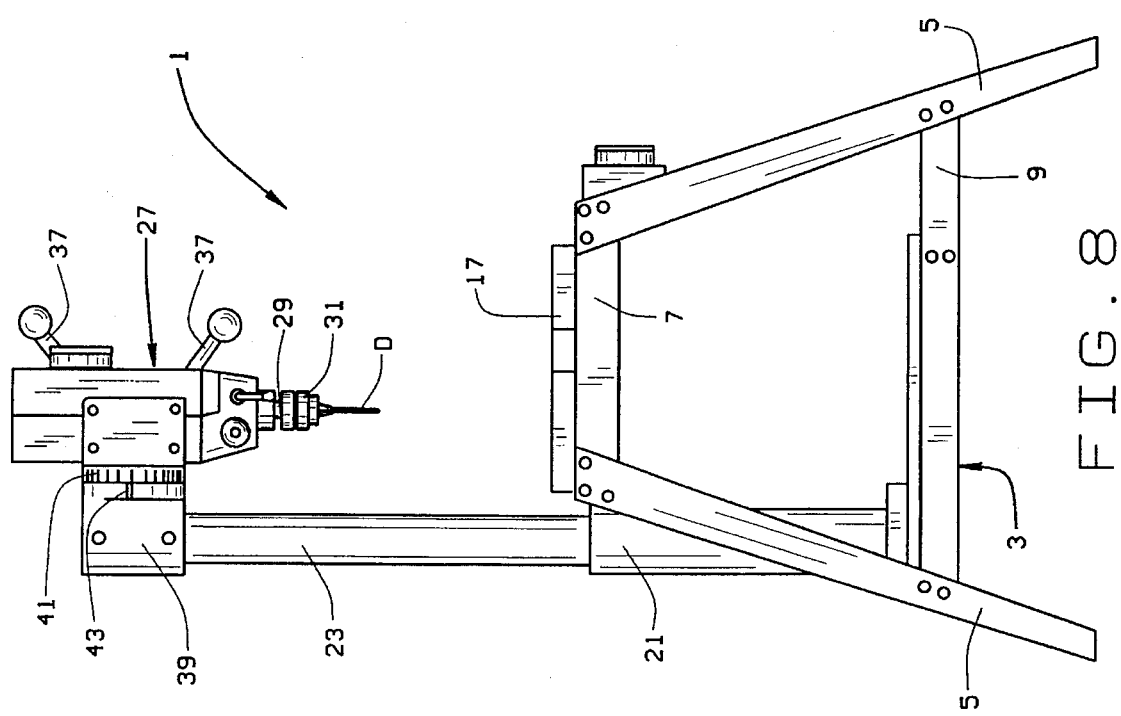

COMBINATION WOODWORKING TOOL

BACKGROUND OF THE INVENTION

The present invention relates to a combination woodworking tool, and more particularly, to a combination woodworking tool with the combined capabilities of a conventional drill press, tilting head drill press, horizontal drill press, overarm router, horizontal router and an optional wood lathe in one multi-purpose tool.

Currently, it is common practice to manufacture the following as separate equipment: conventional drill press, tilting drill press, horizontal drill press, overarm router, horizontal router and wood lathe. Of course, there have been attempts in the prior art to combine tools to provide a multi-purpose tool, but unfortunately, these prior art attempts have unnecessarily become overly complex because they combine un-related tools such as a drill press and a table saw. A primary example is illustrated in U.S. Pat. No. 3,282,309 which shows a multi-purpose tool capable of functioning as a table saw, a disc sanding machine, a lathe, a horizontal boring machine, a vertical drill press and an under-the-table shaper. Other examples of unnecessarily complex multi-purpose tools are shown in U.S. Pat. Nos. 4,494,591; 4,510,980 and 4,566,510. There have been combined rotatable drill and router tools; however, none of such tools included a cooperating work table to perform multiple woodworking operations.

The combination woodworking tool of the present invention is designed to complement separately operating tools such as saws while incorporating related woodworking functions such as vertical drilling, angled hole drilling, horizontal drilling, overarm routing and angled or horizontal routing. A wood lathe adaptation is optional and requires additional parts and set-up, but can be incorporated as part of the combination woodworking tool, if desired.

SUMMARY OF THE INVENTION

Among the several objects and advantages of the present invention include:

the provision of a combination woodworking tool which provides multi-purpose woodworking functions;

the provision of the aforementioned combination woodworking tool which provides a combination drill press/router/lathe;

the provision of the aforementioned combination woodworking tool which provides the combined capabilities of a conventional drill press, tilting drill press, horizontal drill press, overarm router, horizontal router and a wood lathe in one tool;

the provision of the combination woodworking tool that adds features to a drill press such as vertical drilling, angled hole drilling, horizontal drilling, overarm routing and angled or horizontal routing;

the provision of the combination woodworking tool which, in addition, also provides an optional wood lathe application, by the addition of optional parts;

the provision of the aforementioned combination woodworking tool which enables the same powerhead to be used for drilling, routing or other purposes by the simple change of a drill chuck, router collet or other tool holder and by changing the speed as appropriate to the purpose;

the provision of the aforementioned combination woodworking tool which includes an adjustable work table to provide different woodworking operations;

the provision of the aforementioned combination woodworking tool which provides additional woodworking functions by the use of optional accessories including a slideable or removable table or supporting bed, a removable fence or "pin routing" using a template; and the provision of the aforementioned combination woodworking tool which is simple and easy to manufacture, operate and maintain; is durable and long-lasting; is made of a minimum number of parts; is adaptable for a variety of woodworking functions without being overly complex; and is otherwise well adapted for the purposes intended.

Briefly stated, the combination woodworking tool of the present invention includes a frame having a horizontal bed for supporting workpieces. A rigid column is supported by the frame in proximity to and extending vertically upwardly beyond the horizontal bed. A powerhead is mounted to an upper end of the column in overlying relationship to the horizontal bed. The powerhead is vertically adjustable for movement toward and away from the horizontal bed. The powerhead also includes a motor and a spindle which extends below a lower end of the powerhead. The spindle is adapted to interchangeably receive a chuck for use with a drill or a collet for use with a router. The powerhead is adjustably and rotatably mounted relative to the column for positioning the spindle in predetermined vertical, angular or horizontal positions relative to the horizontal bed for vertical, angular or horizontal drilling or routing.

The motor is preferably a switched reluctance motor which is directly connected to the spindle or may be a constant or variable speed (universal, permanent magnet or induction motor) which is connected to a speed changing device that is connected to the spindle.

The combination woodworking tool is also adapted to be used as a wood lathe. For this purpose, the powerhead is vertically adjusted in proximity to the horizontal bed while also being rotatably adjusted relative to the column for positioning the spindle in a horizontal and proximate position relative to the horizontal bed. A lathe tail stock and tool rest are secured to the horizontal bed for cooperative interaction with the horizontally extending spindle for operation of the woodworking tool as a lathe. Alternatively, the horizontal bed may be removed from the frame to facilitate attachment of a lathe tail stock and tool rest to the frame.

For vertically adjusting the powerhead toward and away from the horizontal bed, the powerhead may be vertically adjustable along the length of the column. Alternatively, the column itself may be vertically adjustable for corresponding vertical adjustment of the powerhead.

The powerhead is rotatably and incrementally adjustable preferably through a 360° range of movement relative to the column for positioning the spindle in a desired vertical, angular or horizontal position relative to the horizontal bed.

The horizontal bed may be movable from a position below the powerhead to a position spaced from the powerhead depending on the woodworking operation desired to be performed. The horizontal bed may also be capable of being moved between two opposite sides of the frame. An auxiliary horizontal bed may be provided for movement between such two other opposite sides of the frame.

The motor is preferably capable of operating at a full range of drilling and routing speeds. This includes motor speeds for drilling from approximately 500–5000 rpm to approximately 15,000–25,000 rpm for routing. For this purpose, the motor is preferably a switched reluctance motor which includes an electronic control that not only provides a wide range of speeds, but also provides a sufficient torque at lower speeds for drilling purposes.

The combination woodworking tool includes optional accessories such as a removable fence for the horizontal bed to facilitate routing or drilling of rows of holes.

These and other objects and other advantages of the present invention will become more apparent from the description that follows.

BRIEF DESCRIPTION OF THE DRAWINGS

In the drawings,

FIG. 8 is a side elevational view of the combination woodworking tool illustrating the powerhead with a drill mounted therein and vertically spaced upwardly from the horizontal bed;

FIG. 9 is a side elevational view of the powerhead with a router bit or router collet with bit mounted thereto in vertically proximate position to the horizontal bed;

Corresponding reference numerals will be used throughout the several figures of the drawings.

DESCRIPTION OF THE PREFERRED EMBODIMENTS

Figure 1:
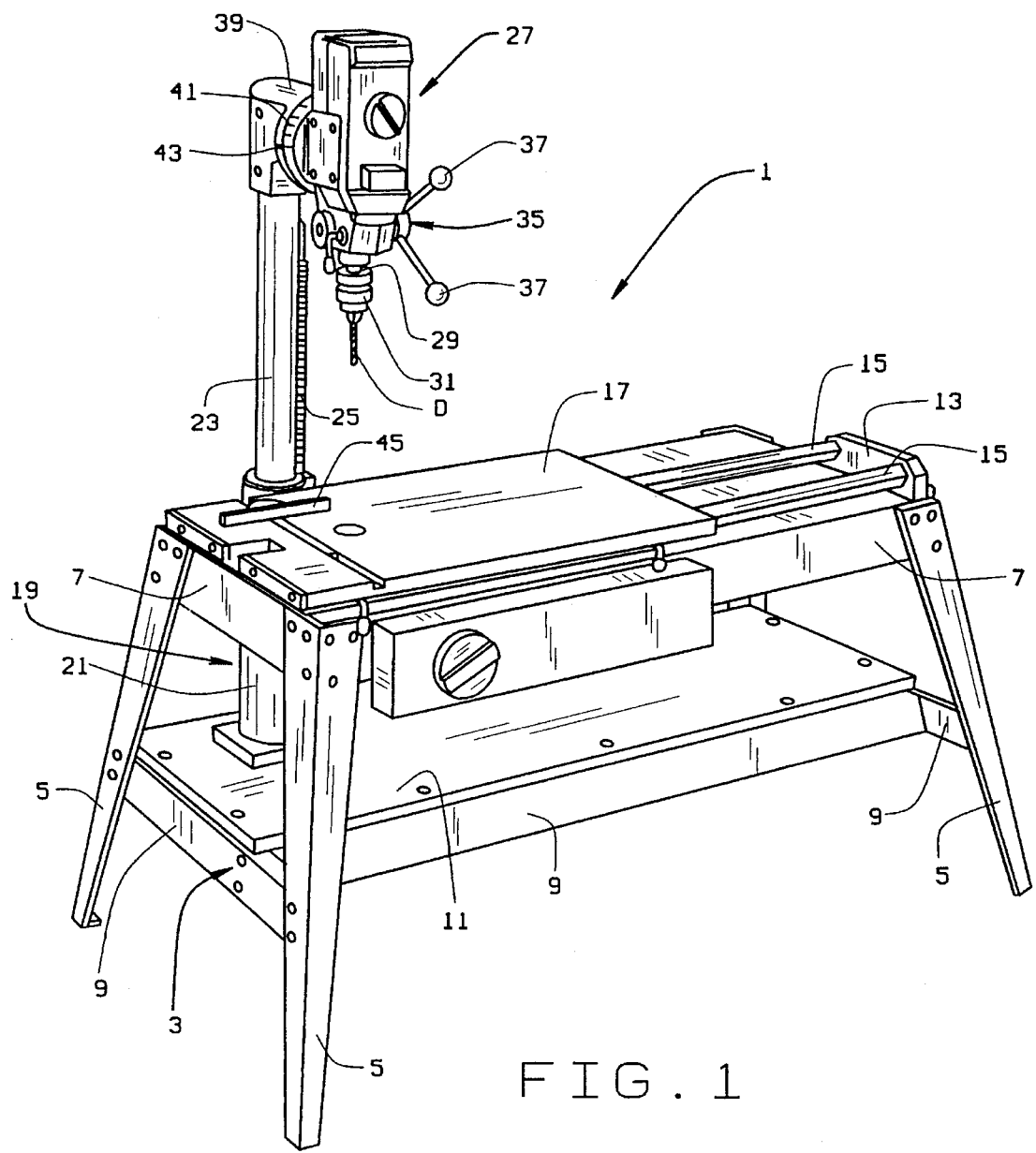
FIG. 1 is a front perspective view of the combination woodworking tool constructed in accordance with the teachings of the present invention.
Figure 2:
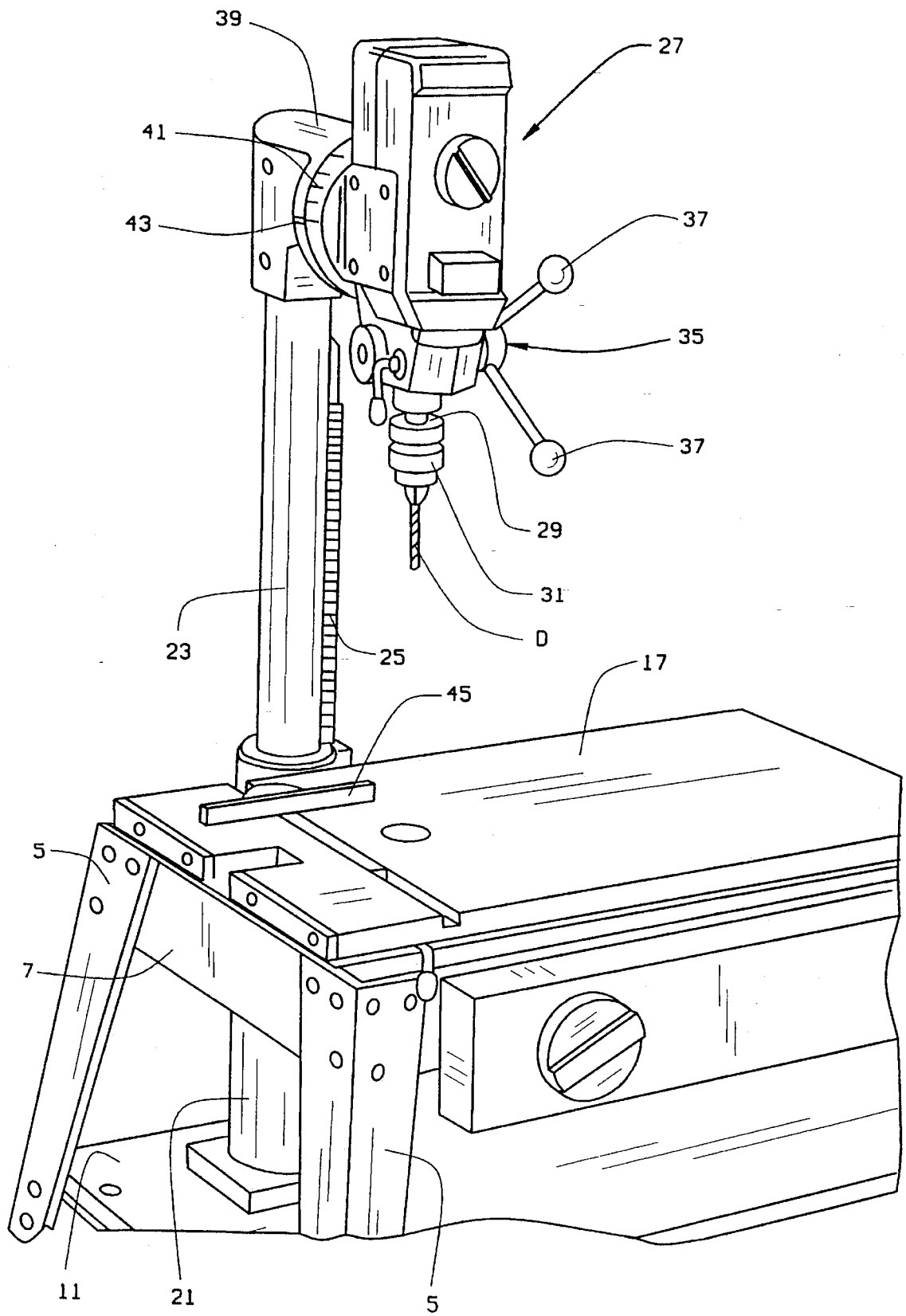
FIG. 2 is a fragmentary front prospective view emphasizing the powerhead and horizontal supporting bed of the combination woodworking tool.

The following detailed description illustrates the invention by way of example and not by way of limitation. The description will clearly enable one skilled in the art to make and use the invention and describes several embodiments, adaptions, variations, alternatives and uses of the invention, including what we presently believe is the best mode of carrying out the invention.

Unlike the complex multi-purpose tools of the prior art which combine unrelated features such as table saws and drills and make such multi-purpose tools overly complex, the combination woodworking tool of the present invention is a multi-purpose tool that is designed to complement tools such as saws while adding features that are primarily relatable to one another. Thus, the combination woodworking tool of the present invention provides the combined capabilities of a conventional drill press, a tilting head drill press, horizontal drill press, overarm router, horizontal router, and if optional parts are added, also a wood lathe and/or sander drum or disc in one multi-purpose tool. As will be seen from the discussion that follows, the multi-purpose tool functions of the combined woodworking tool of the present invention provides vertical drilling, angled hole drilling, horizontal drilling, overarm routing and angled or horizontal routing. In addition, if optional wood lathe parts are added, the combination woodworking tool can also function as a lathe and/or a sander.

The combination woodworking tool 1 of the present invention includes a frame 3 having a series of spaced legs 5 which are interconnected to one another through upper and lower horizontal struts 7, 9 respectively. The lower horizontal struts 9 support a lower horizontal surface 11 while the upper horizontal struts 7 support a bracket 13 at one end for receiving a pair of spaced rods or arms 15, 15 that slidably mount the horizontal bed or upper horizontal surface 17 through suitable brackets/supports (not shown) in a well known manner. The horizontal bed 17 is illustrated as being considerably larger than a typical drill press table for convenience in handling a variety of different woodworking pieces of different sizes and shapes. The slidable movement of the horizontal bed 17 on rods or arms 15, 15 facilitates operation of the combination woodworking tool when certain woodworking operations are being performed, as will be discussed further below.

In the embodiment illustrated in the drawings, the lower horizontal surface 11 of the frame 3 supports a rigid column 19 that is positioned in proximity to and extends upwardly beyond the horizontal bed or upper horizontal surface 17, In the illustrated embodiments, the rigid column 19 includes a lower non-movable rigid column section 21 which telescopically receives an upper movable column section 23 through a rack and pinion drive 25, for example. At the upper end of the telescoping column 23 is a powerhead 27 which is moved toward and away from the horizontal workpiece supporting bed 17 as the column 23 is telescopically received within the fixed column section 21. In lieu of vertically adjusting the powerhead 27 in the manner just described, the powerhead 27 may be vertically adjusted along the length of a fixed column section. Whichever technique is utilized, it is important that the powerhead 27 be capable of moving toward and away from the horizontal bed 17, in order to perform the variety of different woodworking functions for the combination woodworking tool 1 of the present invention.

It is not necessary that the rigid column be mounted to the lower horizontal surface 11 since it will be appreciated that the rigid and telescoping columns 21, 23 could be mounted to the upper transverse frame support 7 or into the frame 3 or in any other manner that is similar to drill press constructions well known in the art.

The powerhead 27 is mounted to an upper end of the column 23 in overlying relationship to the horizontal bed or upper horizontal surface 17. Thus, by vertically adjusting the power head relative to the horizontal bed 17, various drilling or routing functions could be performed on work supported by the horizontal bed 17, as may be desired. The powerhead 27 includes a motor with a spindle connected to the motor output shaft in a manner similar to the construction illustrated in related copending patent application Ser. No. 08/302,201, filed Sep. 8, 1994 entitled VARIABLE SPEED DIRECT DRIVE DRILL PRESS/ROUTER, assigned to the same assignee as the present invention. In its preferred form, the motor is a variable reluctance motor capable of a variable speed drive and/or braking operated by a suitable electronic drive such as shown for example in the aforementioned related copending patent application.

Alternatively, the powerhead 27 may contain a universal, permanent magnet or induction motor and a gear train or belts to provide the wide range of speeds required. For reasons which will become apparent, the use of a switched reluctance motor is desired for the wide range of speeds required while providing sufficient torque at lower operating speeds and optional braking in order to provide quick changeovers between various woodworking operations.

Figure 5:
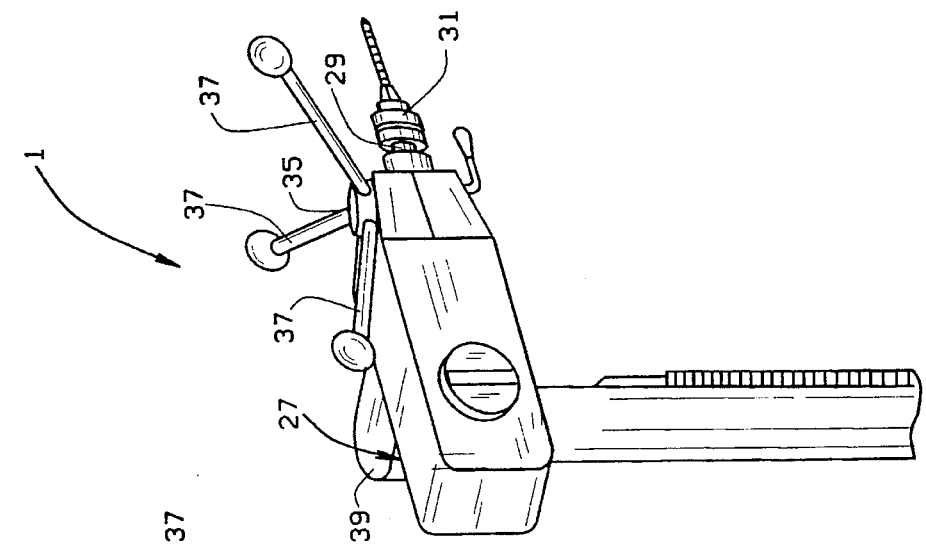
FIG. 5 is a fragmentary front prospective view of the powerhead in a horizontal position for horizontal drilling.
Figure 6:
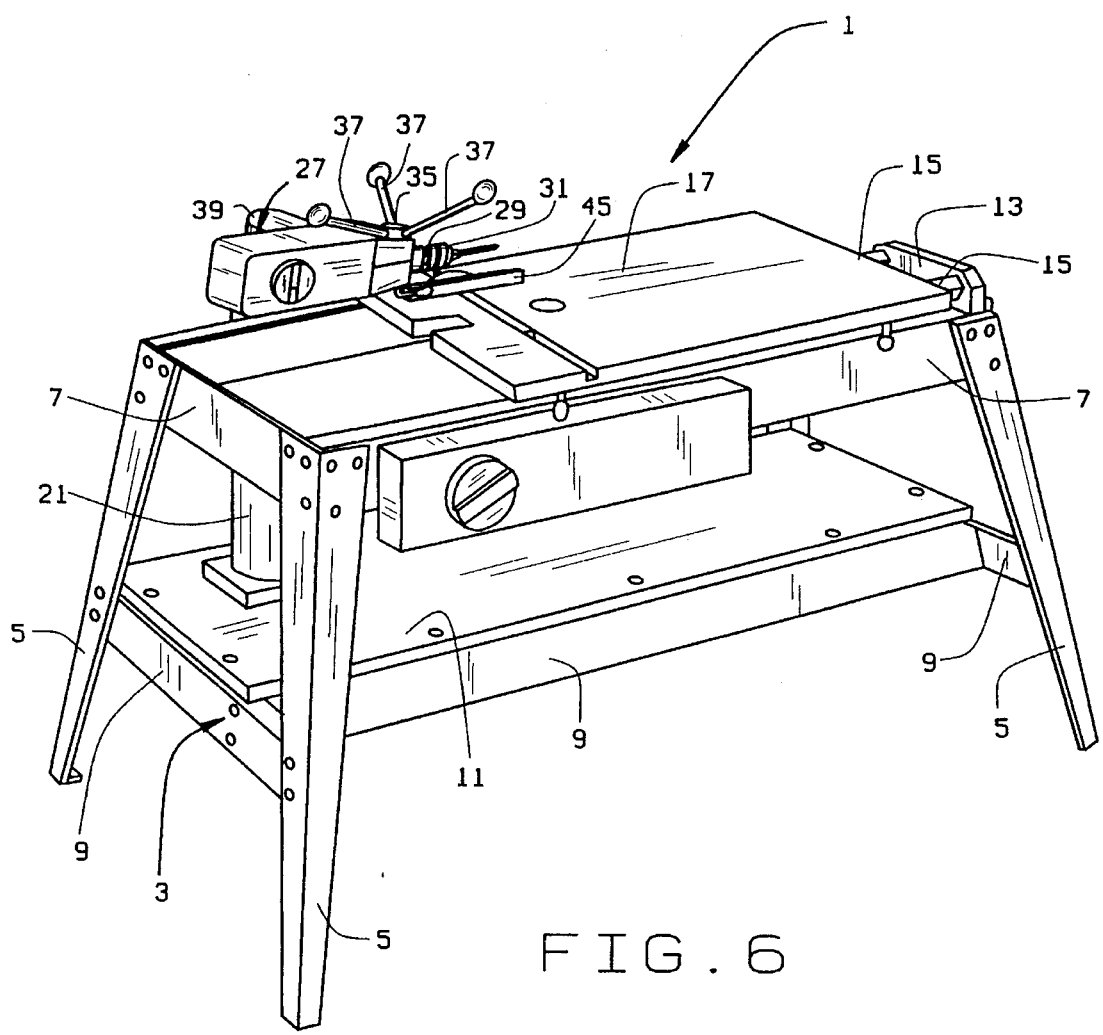
FIG. 6 is a front perspective view of the combination woodworking tool with the powerhead shown in a horizontal position and with the horizontal bed moved to an out-of-the-way position to accommodate the powerhead.
Figure 7:
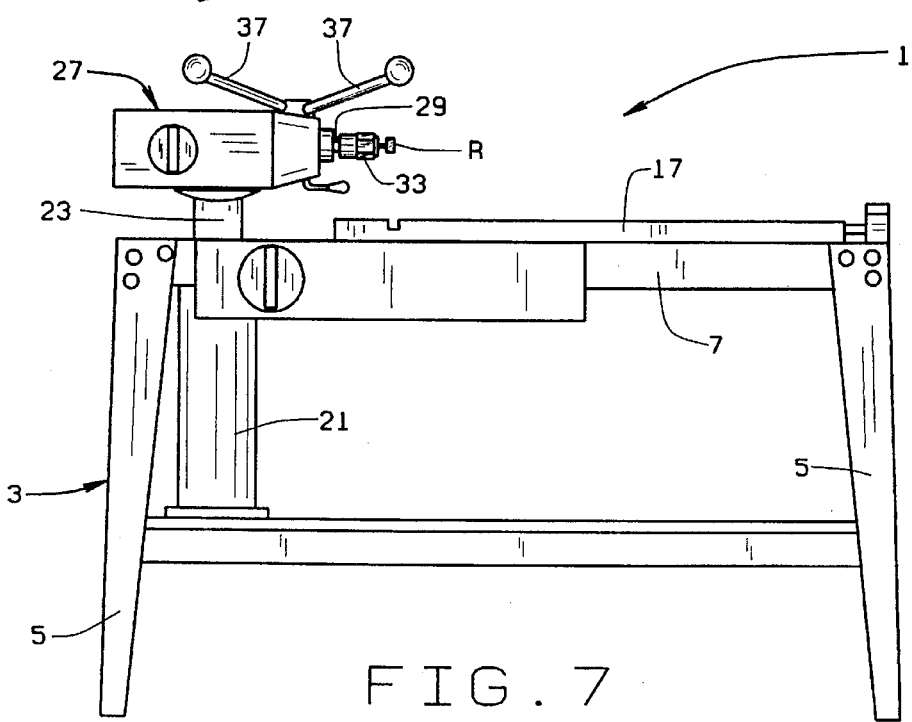
FIG. 7 is a front elevational view of the combination woodworking tool with the powerhead shown in the horizontal position and with the horizontal bed moved to an out-of-the-way position to accommodate the powerhead.

The spindle 29 is shown in the drawings as extending below a lower end of the powerhead 27 for supporting a drill chuck 31 as shown in FIGS. 1–6 and 8 or a router collet 33 as shown in FIGS. 7 and 9. As will be appreciated, the spindle 29 is adapted to interchangeably receive a drill chuck 31 or router collet 33 for operating the powerhead 27 in a vertical drilling or vertical routing operation. The spindle 29 can be moved predetermined distances toward and away from the horizontal bed 17 through the operation of a manually engagable driver or driver motor. In the drawings, the illustrated driver 35 is a manually engagable driver which includes spaced arms 37 for rotating a driver shaft (not shown) which, in turn, rotates a driver pinion (not shown) that engages a rack (not shown) for axially moving the spindle 29 incremental predetermined distances toward and away from the horizontal bed 17. This is also described in further detail in the aforementioned related copending patent application. Thus, in addition to the powerhead 27 being axially movable relative to a column support structure, the spindle 29 itself can be moved incremental predetermined distances in the aforementioned described manner, if desired.

The combination woodworking tool 1 is capable of performing other woodworking operations as well. For this purpose, the powerhead 27 is adjustably and rotatably mounted relative to the column 23 for positioning the spindle 29 in a vertical, angular or horizontal position relative to the horizontal bed or upper horizontal surface 17. In order to achieve this, the powerhead 27 is rotatably mounted to a powerhead support 39 that is positioned on top of the column 23. The powerhead 27 includes a rotary indexing measure 41 for incremental rotatable adjustment relative to a pointer 43 that is mounted on the powerhead support 39 in order to rotatably adjust the powerhead 27 generally through a 180° range of movement relative to the column 23. This enables the spindle 29 to be positioned in any desired vertical, angular or horizontal position relative to the horizontal bed or upper horizontal surface 17.

Figure 4:
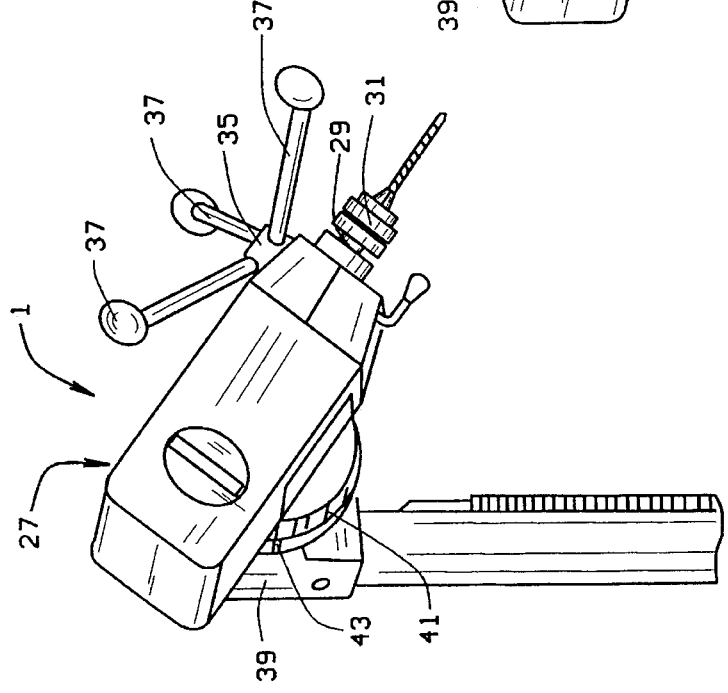
FIG. 4 is a fragmentary front prospective view illustrating the powerhead in an angular position for angled hole drilling.
Figure 3:
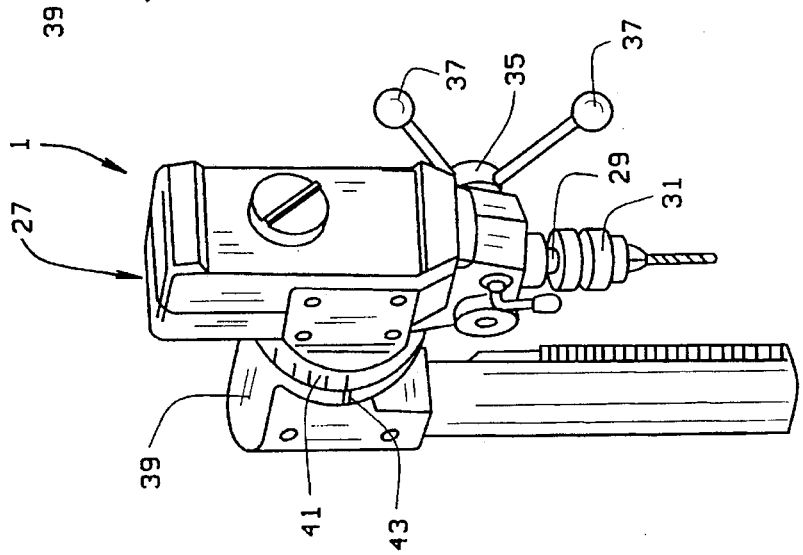
FIG. 3 is a fragmentary front prospective view illustrating the powerhead mounted in a vertical position for vertical drilling.

As a result, the combination woodworking tool 1, with the powerhead 27 adjustably and rotatably mounted relative to the column 23, can position the spindle 29 in predetermined vertical, angular or horizontal positions relative to the horizontal bed or upper horizontal surface 17 for vertical, angular or horizontal drilling or routing. This is best illustrated in FIGS. 3–5 of the drawings which shows a vertically oriented powerhead in FIG. 3, an angularly offset powerhead 27 in FIG. 4 and horizontally positioned powerhead 27 in FIG. 5 for vertical, angular or horizontal drilling or routing. As shown in FIGS. 3–5, a drill chuck 31 is mounted to the spindle 29 for operating the drill D; however, a router collet 33 such as shown in FIGS. 7 and 9 may be used for operating the router bit R.

The powerhead 27 is constructed to have a speed range appropriate for drilling (approximately 500–5000 rpm) and for routing (approximately 1,500°–2,500° rpm). As indicated above, a variable or switched reluctance motor, such as disclosed in the aforementioned related copending patent applications can provide the range of speeds required with sufficient torque for drilling at lower speeds. Alternatively, the powerhead 27 may contain a universal, permanent magnet or induction motor and gear train or belt, as is common in the art, to provide the wide range of speeds required. However, as will be appreciated, the variable or switched reluctance motor provides a compact, efficient, durable and long-lasting power source that can be easily incorporated into the powerhead 27 in order to achieve the various features and advantages of the present invention.

It is important that the horizontal bed 17 be adjustable in order to accommodate different relative positions of the powerhead 27, as described above. Preferably, the horizontal bed 17 is movable from a position below the powerhead 27 to a position spaced from the powerhead 27 depending on the woodworking operation desired to be performed. In general, the horizontal bed 17 is moved from left to right and vice versa, as illustrated in the drawings. This enables the powerhead 27 to be positioned relative to the horizontal bed 17 for different woodworking operations. Alternatively, a removable portion of the horizontal bed 17 may be used, if desired, in order to provide clearance for the powerhead 27.

Thus, when the powerhead 27 is mounted in a horizontal position, such as shown in FIGS. 5 and 6–7 of the drawings, the horizontal bed or upper horizontal surface 17 can be moved to the right to accommodate the powerhead 27. This enables a workpiece to be mounted on the adjustable horizontal bed or upper horizontal surface 17 for different drilling or routing operations. This makes it convenient to route slots or drill rows of holes. As indicated above, the horizontal table 17 is moved to the right or left by being mounted on the parallel arms or slides 15, 15. It will also be appreciated that an auxiliary sliding table may be mounted on the frame 3, for example, for movement in a direction transverse to the horizontal bed 17 for routing mortises or drilling dowel holes when the powerhead 27 is mounted in a horizontal position.

Other accessories can be used with the horizontal bed 17 including a removable fence 45 for convenience in routing slots or drilling rows of holes. Other accessories can be provided in the horizontal bed including a pin for "pin routing" using a template or a variety of other specialized accessories for dove tails, disk or drum sanding, etc.

Figure 10:
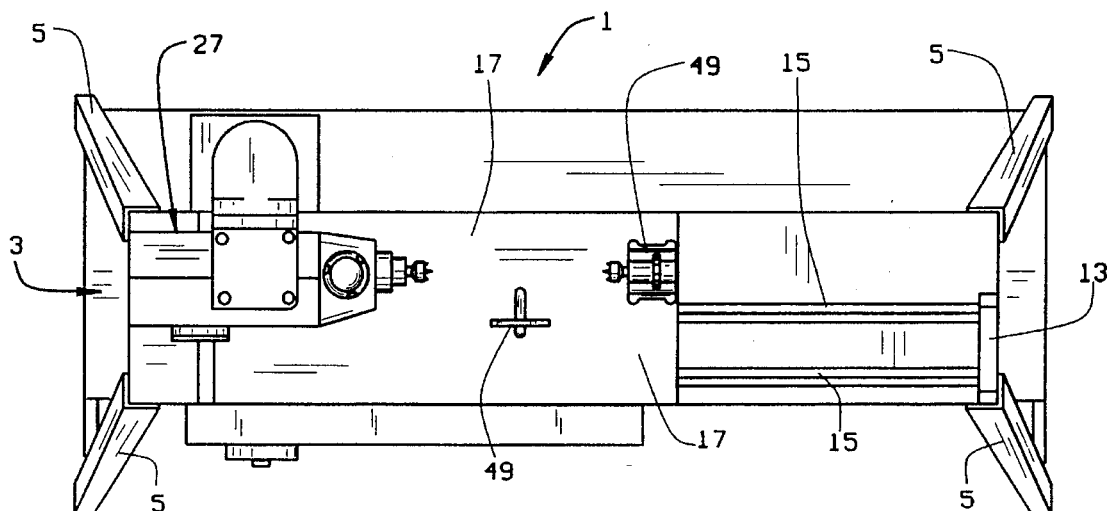
FIG. 10 is a top plan view of the combination woodworking tool with the powerhead mounted in the horizontal position and with a tailstock and tool rest mounted to the horizontal bed for operating the combination woodworking tool as a lathe.
Figure 11:
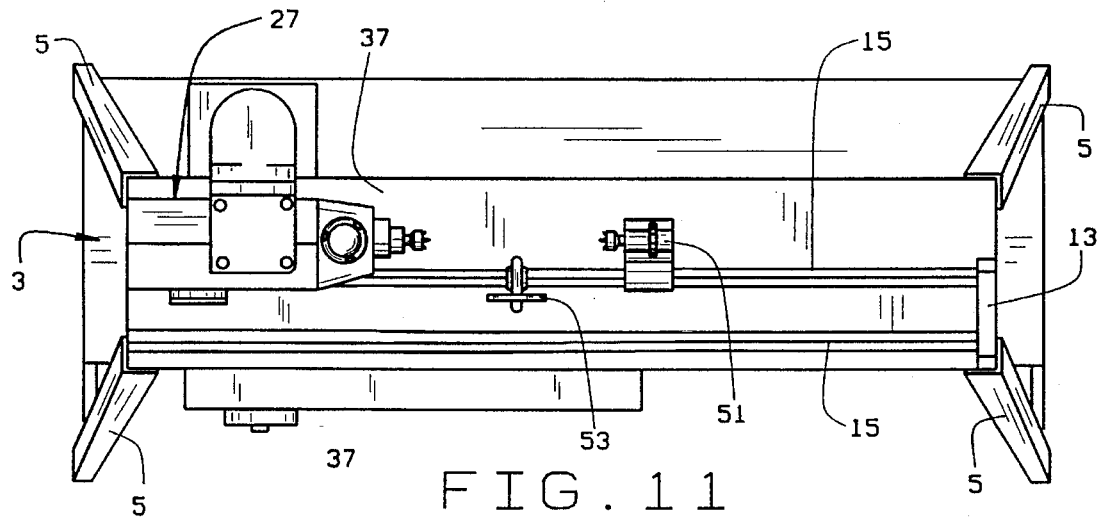
FIG. 11 is a top plan view of the combination woodworking tool with the powerhead mounted in the horizontal position and with a separately mounted tailstock and tool rest for operating the combination woodworking tool as a lathe.

While the combination woodworking tool is primarily useful for vertical, angular or horizontal drilling or routing in conjunction with an adjustable horizontal bed, it is also possible to convert the combination woodworking tool 1 into a lathe. In this regard, the powerhead 27 is located in a horizontal position as shown in FIGS. 10–11 in the drawings. In FIG. 10, the powerhead 27 is positioned a few inches above the horizontal bed 17, and the lathe tail stock 47 and tool rest 49 are fastened to the horizontal bed 17 to create an optional wood lathe. In FIG. 11 of the drawings, the horizontal bed 17 is removed from the frame 3 and a tail stock 51 and tool rest 53 are fastened to the rails or slides 15, 15 in order to create the optional wood lathe.

Figure 12:
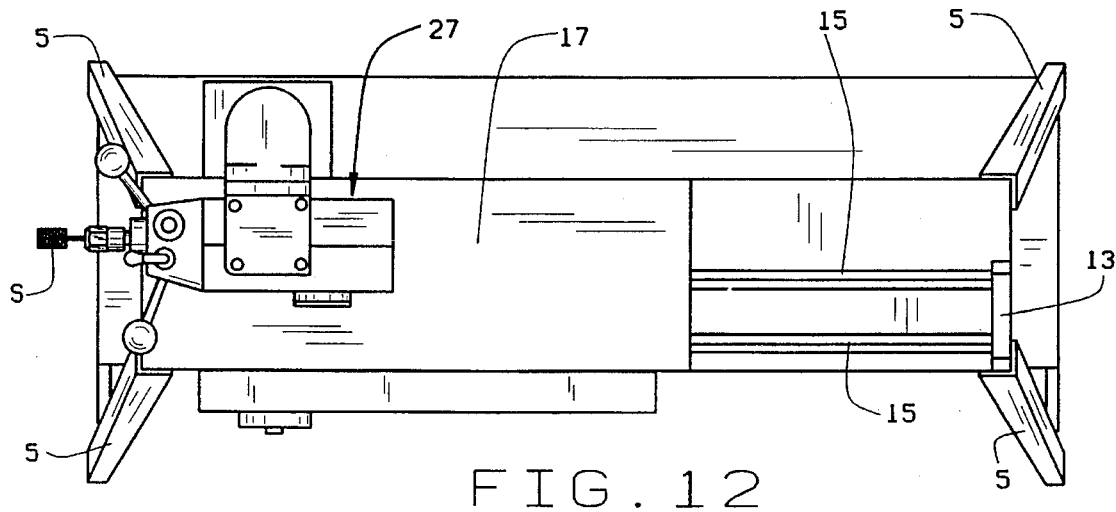
FIG. 12 is a top plan view of the combination woodworking tool with the powerhead positioned in a horizontal position and with a router collet extending off the end of the horizontal bed for sanding.

The powerhead 27 can also be rotated to position the spindle in a direction extending away from the horizontal bed 17 for sanding or bowl turning. This is illustrated in FIG. 12 of the drawings where the powerhead 27 has a sander S attached to the spindle 29, the spindle 29 and sander S extending in a direction away from the horizontal bed 17 for the sanding operation.

From the foregoing, it will now be appreciated that the combination woodworking tool of the present invention provides a multi-purpose tool with related woodworking functions such as vertical drilling, angle hole drilling, horizontal drilling, overarm routing and angled or horizontal routing. In addition, a wood lathe adaption is possible through the addition of optional parts and set up, if desired.

In view of the above, it will be seen that the several objects and features of this invention are achieved and other advantageous results obtained.

As various changes could be made in the above construction without departing from the scope of the invention, it is intended that all matter contained in the above description or shown in the accompanying drawings shall be interpreted as illustrative and not in a limiting sense.

We claim:

1. A combination woodworking tool comprising:

a frame including a horizontal bed mounted above the frame for supporting workpieces;

a rigid column supported by the frame in proximity to and extending vertically upwardly beyond the horizontal bed;

a powerhead mounted to an upper end of the column in overlying relationship to the horizontal bed, said powerhead being vertically adjustable for movement toward and away from the horizontal bed;

the powerhead including a motor and a spindle which extends below a lower end of the powerhead, the spindle being adapted to interchangeably receive various tool holders;

the powerhead being adjustably and rotatably mounted relative to the column for positioning the spindle in predetermined vertical, angular or horizontal positions relative to the horizontal bed for vertical, angular or horizontal drilling or routing; and the horizontal bed being independently mounted and horizontally adjustable on the frame relative to the rigid column that supports the powerhead for accommodating different adjustable and rotatable positions of the powerhead relative to the horizontal bed.

2. The combination woodworking tool as defined in claim 1 wherein the motor is a switched reluctance motor which is directly connected to the spindle.

3. The combination woodworking tool as defined in claim 1 wherein the motor operates at a predetermined speed and is connected to a speed changing device that is connected to the spindle.

4. The combination woodworking tool as defined in claim 1 wherein the powerhead is vertically adjusted in proximity to the horizontal bed while also being rotatably adjusted relative to the column for positioning the spindle in a horizontal and proximate position relative to the horizontal bed, securing a lathe tailstock and tool rest to the horizontal bed for cooperative interaction with the horizontally extending spindle for operation of the woodworking tool as a lathe.

5. The combination woodworking tool as defined in claim 4 wherein at least part of the horizontal bed is removed from the frame to facilitate attachment of a lathe tailstock and tool rest to the frame, and the powerhead being vertically and rotatably adjusted for positioning the spindle in a horizontal position for cooperation with the lathe tailstock and tool rest in operating the woodworking tool as a lathe.

6. The combination woodworking tool as defined in claim 1 wherein the powerhead is vertically adjustable along the length of the column.

7. The combination woodworking tool as defined in claim 1 wherein the column is vertically adjustable for corresponding vertical adjustment of the powerhead.

8. The combination woodworking tool as defined in claim 1 wherein the powerhead is rotatably and incrementally adjustable through a 360° range of movement relative to the column for positioning the spindle in a desired vertical, angular or horizontal position relative to the horizontal bed.

9. The combination woodworking tool as defined in claim 1 wherein the horizontal bed is movable from a position below the powerhead to a position spaced from said powerhead depending on the woodworking operation desired to be performed.

10. The combination woodworking tool as defined in claim 9 wherein the horizontal bed is capable of being moved between two opposite sides of the frame.

11. The combination woodworking tool as defined in claim 10 and further includes a horizontal bed that is at least partially removable from the frame.

12. The combination woodworking tool as defined in claim 1 wherein the powerhead is rotated for adjustably positioning the spindle in a horizontal position that extends in a direction away from the horizontal bed for operation of the spindle in sanding or bowl turning.

13. The combination woodworking tool as defined in claim 1 and including a removable fence for the horizontal bed to facilitate routing or drilling of rows of holes.

14. The combination woodworking tool as defined in claim 1 wherein the motor speed ranges from approximately 500–5000 rpm for drilling to approximately 15,000–25,000 rpm for routing.

15. A combination woodworking tool comprising:

a frame including a horizontal bed mounted above the frame for supporting workpieces;

a rigid column supported by the frame in proximity to and extending vertically upwardly beyond the horizontal bed;

a powerhead mounted to an upper end of the column in overlying relationship to the horizontal bed, the powerhead being vertically adjustable for movement toward and away from the horizontal bed;

the powerhead including a motor connected to a spindle which extends below a lower end of said powerhead, the spindle being adapted to interchangeably receive various toolholders;

the motor being capable of operating at a full range of drilling and routing speeds; and the powerhead being adjustably and rotatably mounted relative to the column for positioning the spindle in a vertical, angular or horizontal position relative to the horizontal bed; and the horizontal bed being independently and laterally adjustable relative to the powerhead to accommodate different adjustable and rotatable relative positions of the powerhead for different woodworking operations.

16. The combination woodworking tool as defined in claim 15 wherein the motor is a switched reluctance motor.

17. The combination woodworking tool as defined in claim 16 and including an electronic control for the switched reluctance motor that provides a wide range of speeds with sufficient torque at lower speeds for drilling and lathe operations.

18. A combination woodworking tool comprising:

a frame including a horizontal bed mounted above the frame for supporting workpieces;

a rigid column supported by the frame in proximity to and extending upwardly beyond the horizontal bed;

a powerhead mounted to an upper end of the column in overlying relationship to the horizontal bed, the powerhead being vertically adjustable along the rigid column for movement toward and away from the horizontal bed;

the powerhead including a motor with a spindle that extends below the powerhead, the spindle adapted to interchangeably receive various toolholders;

the powerhead being adjustably and rotatably mounted relative to the column for positioning the spindle in a vertical, angular or horizontal position relative to the horizontal bed; and the horizontal bed being independently and adjustably mounted on said frame relative to the rigid column that supports said powerhead in order to provide movement of said horizontal bed between an underlying position and a spaced position relative to different adjustable and rotatable positions of the powerhead depending on the woodworking operation desired to be performed.

19. The combination woodworking tool as defined in claim 10 wherein the horizontal bed is slideably mounted relative to the frame.

20. The combination woodworking tool as defined in claim 18 wherein the horizontal bed is removable from the frame.

21. The combination woodworking tool as defined in claim 19 wherein the horizontal bed has a workpiece supporting surface of substantial length and width for handling large wood workpieces.

22. The combination woodworking tool as defined in claim 18 wherein the motor is capable of operating at a full range of drilling and routing speeds.

23. The combination woodworking tool as defined in claim 22 wherein the motor is a switched reluctance motor with a wide range of speeds and with sufficient torque at lower speeds.

24. The combination woodworking tool as defined in claim 18 wherein the motor operates at a predetermined speed and is connected to a speed changing device that is connected to the spindle.

25. A combination woodworking tool comprising:

a frame including upper and lower horizontal surfaces, the upper horizontal surface providing a workpiece supporting surface and the lower horizontal surface supporting a rigid column that is positioned in proximity to and extends upwardly beyond the upper horizontal surface;

a powerhead mounted to an upper end of the column in overlying relationship to the upper horizontal surface, the powerhead being vertically adjustable for movement toward and away from the upper horizontal surface;

the powerhead including a motor and spindle which extends below a lower end of the powerhead, the spindle being adapted to interchangeably receive various toolholders;

the motor being capable of operating at a full range of drilling and routing speeds;

the powerhead being adjustably and rotatably mounted relative to the column for positioning the spindle in a vertical, angular or horizontal position relative to the upper horizontal surface; and the upper horizontal surface being independently and adjustably mounted on the frame relative to the rigid column that supports the powerhead for movement between an underlying position and spaced position relative to different adjustable and rotatable positions of the powerhead depending on the woodworking operation desired to be performed.

* * * * *